United States Patent [19]

Obremski

[11] 4,156,256

[45] May 22, 1979

[54] ARRANGEMENT FOR THE RECORDING AND REPRODUCTION OF WIDE FREQUENCY BAND VIDEO SIGNALS

[75] Inventor: Michael Obremski, Fuerth, Fed. Rep. of Germany

[73] Assignee: Grundig E.M.V. Elektro-Mechanische Versuchsanstalt Max Grundig, Fuerth, Fed. Rep. of Germany

[21] Appl. No.: 831,533

[22] Filed: Sep. 8, 1977

[30] Foreign Application Priority Data

Sep. 17, 1976 [DE] Fed. Rep. of Germany ....... 2641816

[51] Int. Cl.$^2$ .......................... G11B 5/04; H04N 5/78
[52] U.S. Cl. ........................................ 360/22; 360/21; 360/24
[58] Field of Search .................. 360/22, 21, 9, 24, 33, 360/29–30; 358/4, 127, 301

[56] References Cited

U.S. PATENT DOCUMENTS

| | | | |
|---|---|---|---|
| 2,941,032 | 6/1960 | Geiger et al. | 358/4 |
| 2,989,595 | 6/1961 | Hunter | 360/21 |
| 3,037,091 | 5/1962 | Rothe | 360/22 |
| 3,234,323 | 2/1966 | Kihara | 360/22 |
| 3,723,643 | 3/1973 | Suzuki | 360/24 |
| 3,764,739 | 10/1973 | Faroudja | 358/4 |
| 3,812,523 | 5/1974 | Narahara | 358/4 |
| 3,821,797 | 6/1974 | Suzuki et al. | 360/24 |

*Primary Examiner*—Alfred H. Eddleman

[57] ABSTRACT

Method of recording and reproduction of wide frequency band video signals onto or from a magnetizable recording carrier, carried out by the following means: means for separating of the video frequency signals into first and second signals of lower and upper frequency range respectively, for converting said second signal into a third signal the frequency range of which equaling that of said first signal, for frequency modulating a carrier wave frequency by said first and third signals and for recording the frequency modulated signals by means of a twin head, for reproducing the recorded signals by means of a twin head and for amplifying, limiting and demodulating the recorded signals and reconverting the third signal into its original frequency range and combining the so reconverted third signal and said first signal.

3 Claims, 2 Drawing Figures

ARRANGEMENT FOR THE RECORDING AND REPRODUCTION OF WIDE FREQUENCY BAND VIDEO SIGNALS

BACKGROUND OF THE INVENTION

In view of the limited band width of the frequency band of simple tape video recording and reproducing apparatuses for home use a color television signal can be recorded only with losses in quality and after a considerable transformation of the original video signals.

For example, in a widely used European system of recording and reproduction, the brightness and chrominance signals are separated from each other. A carrier frequency located at about 4 MHz is frequency-modulated with the brightness signal, which is limited to 2.7 MHz. The chrominance signal is moved out of its original frequency position into a new frequency range, which is located lower than that of the lower side bands of the frequency-modulated brightness signals. Thereafter the frequency-converted color signals are added and recorded.

Japanese systems, which also were developed especially for home use, use essentially the same principle. Both systems suffer from serious disadvantages. The procedure is intricate and includes many possibilities for error, if the luminance and chrominance signals are separated, processed in a different manner and then put together again. The frequency band width of the brightness signal must be narrowed. Since a portion of the tape recorded information is contained in the amplitude, the advantage of frequency modulation largely is lost. The track width cannot be reduced below a certain minimum figure and the color information is recorded at a relatively large wave length. The danger of cross-talk and especially cross-color disturbances between neighboring tracks exists just where it is most conspicuous. This can be avoided by the provision of guard bands between the tracks, but because the guard bands do not carry any information a large amount of tape is needed.

If guard bands between adjacent tracks are omitted, adjacent tracks are recorded and read at different azimuth angles, and the polarity of the color information is changed from line to line, which requires not only additional electronics but requires a radically different layout of the whole electronic circuit, depending upon whether the apparatus is to be used for NTSC, PAL or SECAM.

SUMMARY OF THE INVENTION

It is an object of the present invention to provide a recording and reproducing arrangement for wide frequency band video signals onto or from a magnetizable carrier, which avoids the above described faults and which especially permits the recording of the full video frequency band with small and inexpensive apparatuses and without additional tape consumption at full utilization of the advantages of frequency modulation. The color television system (NTSC, PAL or SECAM) does not influence the recording, so that the same apparatus can be used for all systems, except of course, for different power supply frequencies.

The inventive combination is new and brings out a surprising result. For example, the frequency transformation of a portion of the color television signal is known. U.S. Pat. No. 3,234,323 discloses the method of modulation onto a carrier frequency for the brightness and the color and to record each in parallel tracks. German Pat. No. 1,935,109 discloses means to record on adjacent tracks without leaving space in between, but with different azimuth angles. In comparison, none of the known arrangements permits recording of the full color television signal frequency band with small and inexpensive apparatus independently of the color transmission system and with full utilization of the advantages of frequency modulation and without additional tape consumption and loss of quality.

DESCRIPTION OF THE PREFERRED EMBODIMENT

Figure 1:
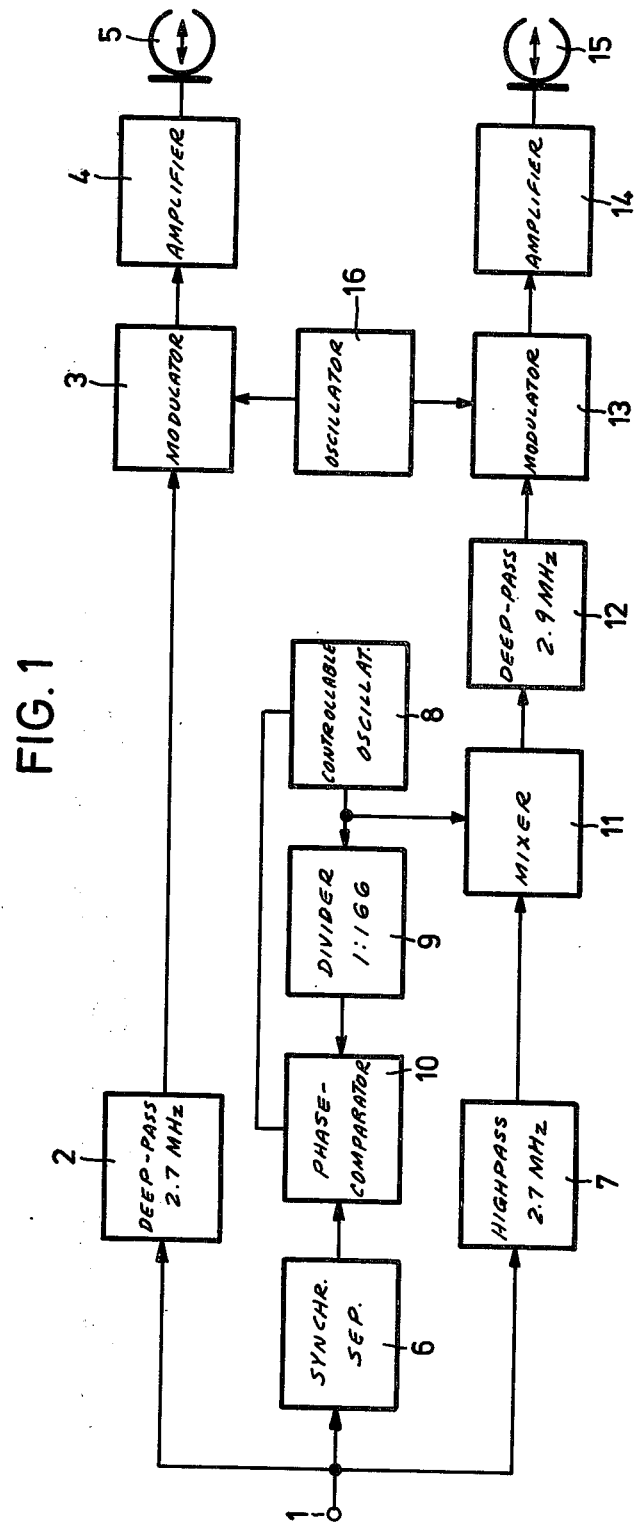
FIGS. 1 and 2 taken together provide a diagrammatic showing of the subject invention.

An embodiment of the invention is shown in the FIGS. in which for example the mean track spacing amounts to 187 $\mu$m, the width of a track itself is 130 $\mu$m, the frequency modulation deviation ranges from 3.1 MHz to 4.5 MHz, and at this condition video signals up to 2.7 MHz with 10 dB loss can be recorded. If now, according to the invention, the mean track spacing is divided into two tracks each of 93.5 $\mu$m track width lying parallel and adjacent to one another without interspace, and if, from the signal which is introduced at connection 1, a lower frequency range extending up to 2.7 MHz is separated by a low-pass filter 2, then this lower frequency range may be frequency modulated in a modulator 3 and after appropriate amplification in an amplifier 4 be recorded by a magnetic transducer head 5, just as well as in the aforementioned original state. Simultaneously, the line synchron impulses are separated at 6 and an upper frequency range of the color television signal from 2.7 MHz to 5.5 MHz is made available over the high-pass filter 7. The frequency of the output voltage of a voltage controlled oscillator (VCO) 8 with a nominal frequency of about 2.6 MHz is divided in a divider 9 by, for example, 166 and compared with the line synchron impulses in a phase comparator 10; the difference signal synchronizes the oscillator 8 to a frequency which is an integral multiple of the line frequency. The mixing of the output voltages of the oscillator 8 and of the high-pass filter 7 in a mixing unit 11 and the limiting by a low-pass filter 12, whose cut-off frequency may lie a little higher than those of 2, effects a transposition of the upper video frequencies into the same frequency range as is behind the low-pass filter 2; the signals applied to the frequency modulators 3 and 13, may also be treated in the same manner, especially with respect to a possible pre-emphasis and the modulation itself; the last is indicated by a common carrier wave oscillator 16. The signal, which is frequency modulated in 13, is applied by way of an amplifier 14 to a further magnetic head 15, which is preferably combined with the magnetic head 5 to form a twin head, recording simultaneously with head 5 parallel tracks without any interspace. Technologically, the amplifiers 4 and 14 and the heads 5 and 15 are of equal design; as later will be explained, only the azimuth angles of the gaps of heads 5 and 15 differ from each other.

Figure 2:
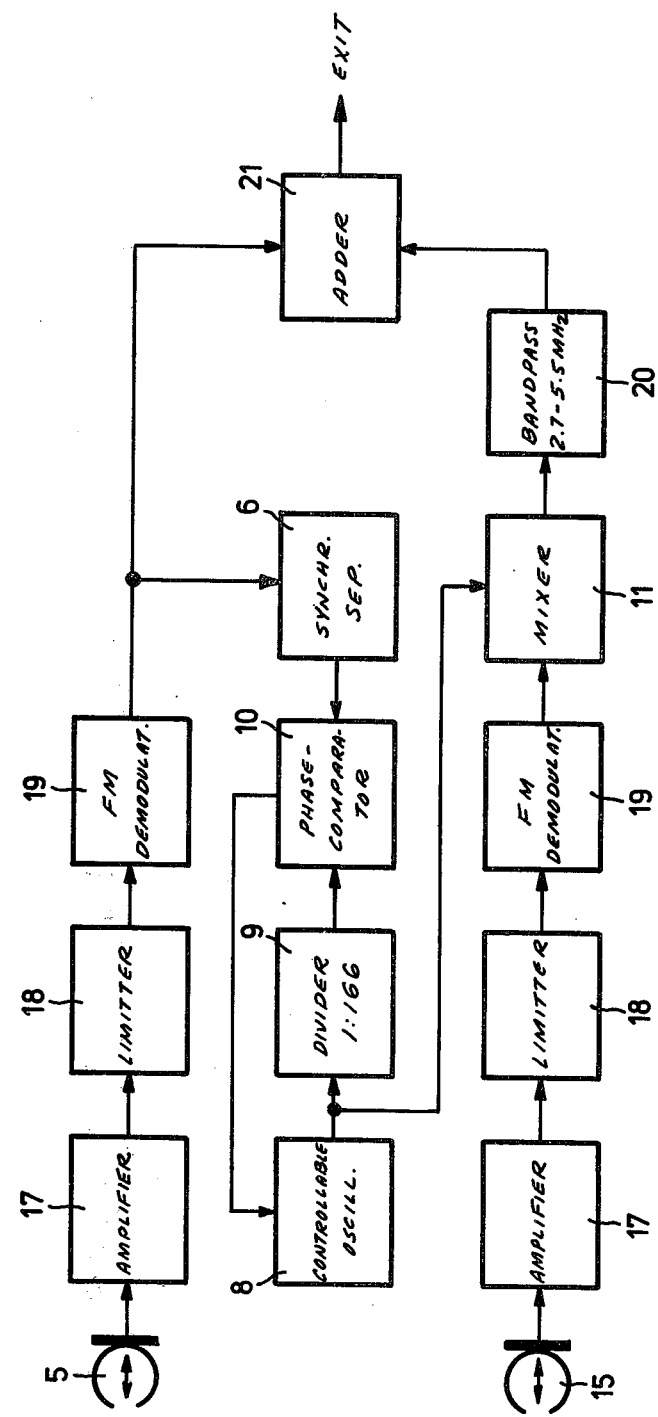

In the play-back apparatus according to FIG. 2, the amplifiers 17, the limiters 18 and the demodulators 19, which are following the heads 5 and 15, are once more built wholly alike; the blocks 6, 8, 9, 10 and 11 are the same for recording, according to FIG. 1 and for reproducing, according to FIG. 2. The output voltage of the mixing unit 11 is taken through a band-pass filter 20, which filters out the upper side band of the mixing product, and transfers it to an adder stage 21, which also receives the demodulated signals read by head 5. If necessary, there may be inserted frequency-response corrections at suitable places, deemphasis on offset compensators, and this in both channels.

The synchronization to the line frequency of the mixing frequency of the oscillator 8, which is required for the frequency shift, proves to be especially advantageous, because by this, large time basis deviations are compensated for. The upper cut-off frequency of the demodulated signal, which head 5 picks up, is thus shifted exactly as much as the lower cut-off frequency behind the band-pass filter 20, so that the crossover positions between the two ranges of video frequencies are not changed relative to each other.

As a result, compared with the original shape, the upper useful video frequency can be doubled without loss of playing time or quality, and this, without having to extract the chrominance signal out of the color television signal and without having information carried by the amplitude of the magnetization, which exists at the tape. For this latter reason, the width of the tracks may be further decreased, and in this way, the playing time can be again increased.

Compared with the aforementioned Japanese system, it is true that this system also uses the advantage of abutting tracks. But instead of this, another advantage is obtained in that the very complicated and from television system to television system very different processing of the color signal is avoided; also the disadvantage of a chrominance sub-carrier transposed into a low frequency range, namely the therewith associated danger of cross-talk from track to track is very greatly reduced. For example: the converted chrominance sub-carrier frequency is normally of the order of 600 kHz. If there is a track width without interspace of 55 μm, a head to tape speed of 6000 mm/s and an azimuth-angle of 8° Which is contrarotating from track to track (which means 16° effective for each head), and the scanning head deviates by 9% of the track width out of its track, the cross-talk results in a signal to noise ratio of 20.4 dB. This ratio is too small and must therefore be further diminished by complicated and expensive electronic means with the help of comb filters. According to the invention all recorded frequencies are located at 4 MHz; under otherwise equal circumstances the cross-talk ratio now amounts to 45 dB, which requires no additional distortion suppressing means.

The invention is not limited to the specific oblique track recording, but can also be used at the transverse track, or the longitudinal track methods using rotating magnetic heads. The advantages derived from the invention is independent of the shape (form) of the record carrier and of the track.

I claim:

1. An apparatus for the recording and reproducing of wide frequency band color video signals onto or from two adjacent tracks of a magnetizable recording carrier, whereat the color video signal to be recorded is separated into a lower and upper frequency range, said lower frequency range frequency modulating a carrier wave, said apparatus further comprising:
   a. means for converting said upper frequency range into said lower frequency range;
   b. means for frequency modulating said carrier wave by said converted upper frequency range;
   c. twin head means for simultaneously recording both said frequency modulated signals; and,
   d. means for reproducing the recorded signals encoding the twin head, means for amplifying, limiting and demodulating the recorded signals and for reconverting the converted upper frequency range into its original frequency range and for combining the reconverted signal and the lower frequency range signal.

2. The apparatus in accordance with claim 1 wherein the mixing frequency used for the converting and reconverting of the upper frequency range is an integral multiple of the line frequency.

3. The apparatus in accordance with claim 1 wherein the individual recording heads of the twin head have azimuth-angles which are different from zero and are equal in value but oppositely inclined.

* * * * *